(12) United States Patent
Edwards

(10) Patent No.: US 7,857,351 B2
(45) Date of Patent: Dec. 28, 2010

(54) MOTORCYCLE AUXILIARY FUEL TANK

(76) Inventor: Jerry A. Edwards, 5602 NE. Skyport Way, Portland, OR (US) 97218

( * ) Notice: Subject to any disclaimer, the term of this patent is extended or adjusted under 35 U.S.C. 154(b) by 439 days.

(21) Appl. No.: 11/775,445

(22) Filed: Jul. 10, 2007

(65) Prior Publication Data
US 2008/0011743 A1    Jan. 17, 2008

Related U.S. Application Data

(60) Provisional application No. 60/807,106, filed on Jul. 12, 2006.

(51) Int. Cl.
*B62J 35/00* (2006.01)
(52) U.S. Cl. ................... 280/834; 220/4.14
(58) Field of Classification Search ............... 280/834, 280/835; 220/4.14
See application file for complete search history.

(56) References Cited

U.S. PATENT DOCUMENTS

| | | | | |
|---|---|---|---|---|
| 2,548,987 A * | 4/1951 | Mayo | ................... | 141/59 |
| 4,175,630 A * | 11/1979 | Fleisher et al. | ................... | 180/225 |
| 4,178,004 A * | 12/1979 | Shinoda et al. | ................... | 280/834 |
| 4,396,084 A * | 8/1983 | Yoshimura et al. | ................... | 180/219 |
| 4,469,190 A * | 9/1984 | Yamaguchi | ................... | 180/219 |
| 4,577,719 A * | 3/1986 | Nomura et al. | ................... | 180/219 |
| 4,602,599 A * | 7/1986 | Glagola | ................... | 123/179.9 |
| 4,799,565 A * | 1/1989 | Handa et al. | ................... | 180/69.4 |
| 5,924,514 A * | 7/1999 | Bullerdick | ................... | 180/314 |
| 6,179,145 B1 * | 1/2001 | Roth | ................... | 220/4.14 |
| 7,255,190 B1 * | 8/2007 | Floro | ................... | 180/219 |
| 2009/0101220 A1 * | 4/2009 | Mundy | ................... | 137/575 |

* cited by examiner

*Primary Examiner*—Kevin Hurley
(74) *Attorney, Agent, or Firm*—Ian F. Burns & Associates, P.C.

(57) ABSTRACT

An auxiliary fuel tank for use with a motorcycle. The auxiliary fuel tank can be mounted in a saddlebag. The fuel tank can include a container that defines a reservoir for holding fuel. The container can be shaped such that the container can fit inside the saddlebag. A mounting mechanism is coupled with the container. The mounting mechanism can be connected with the motorcycle in order to support the container and the saddlebag.

20 Claims, 10 Drawing Sheets

MOTORCYCLE AUXILIARY FUEL TANK

FIELD OF THE INVENTION

The present invention relates to motorcycles, and more particularly to an additional or auxiliary fuel tank for use with a motorcycle.

BACKGROUND

Many motorcycles have large engines that consume fuel at a relatively rapid rate. In addition, some motorcycles are designed with relatively small fuel tanks to create a particular appearance. For example, a motorcycle fuel tank may be made thinner and smaller so that more room is created around a motorcycle driver.

The small fuel tank may cause many motorcycles to suffer from a limited operating range, which can be a great inconvenience to a motorcycle rider. When operating in sparsely populated areas, a motorcycle may not have enough range to travel between fuel stations.

Motorcycles typically use saddlebags to store or hold objects. For example a motorcycle driver may use saddlebags to hold various types of luggage or clothing for a trip. Saddlebags are generally positioned on the sides of motorcycles. Saddlebags may be made of leather and they may have a shape that is specific to the motorcycle.

Motorcycle owners frequently spend a significant amount of money and time so that their motorcycle has a specific appearance. They do not wish to add items to their motorcycles that unfavorably alter the appearance of the motorcycle.

What is needed is an additional fuel tank for a motorcycle that can be added to a motorcycle without altering the overall appearance of the motorcycle.

SUMMARY OF ONE EMBODIMENT OF THE INVENTION

Advantages of One or More Embodiments of the Present Invention

The various embodiments of the present invention may, but do not necessarily, achieve one or more of the following advantages:

provide an auxiliary fuel tank for a motorcycle that can be mounted inside a saddlebag;

provide an auxiliary fuel tank for a motorcycle that can increase the operating range of a motorcycle;

provide an auxiliary fuel tank for a motorcycle that is shaped like a saddlebag;

provide a container for fuel that has a leather-like appearance;

provide an auxiliary fuel tank for a motorcycle that can transfer fuel from the auxiliary tank to a main tank;

provide a pump for an auxiliary fuel tank for a motorcycle that can transfer fuel to and from a main tank and an auxiliary tank; and provide a fuel filter for an auxiliary fuel tank for a motorcycle.

These and other advantages may be realized by reference to the remaining portions of the specification, claims, and abstract.

BRIEF DESCRIPTION OF ONE EMBODIMENT OF THE PRESENT INVENTION

In certain embodiments, the present invention relates to an auxiliary fuel tank for a motorcycle that can be mounted in a saddlebag. The fuel tank can include a container that defines a reservoir for holding fuel. The container is shaped such that the container can fit inside a saddlebag. A mounting mechanism is coupled with the container. The mounting mechanism can be connected with the motorcycle in order to support the container and the saddlebag.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one embodiment of the invention in detail, it is to be understood that the invention is not limited in its application to the details of the construction and to the arrangement of the components set forth in the following description, or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the embodiments, reference is made to the accompanying drawings, which form a part of this application. The drawings show, by way of illustration, specific embodiments in which the invention may be practiced. It is to be understood that other embodiments may be utilized, and structural changes may be made without departing from the scope of the present invention.

Figure 1:
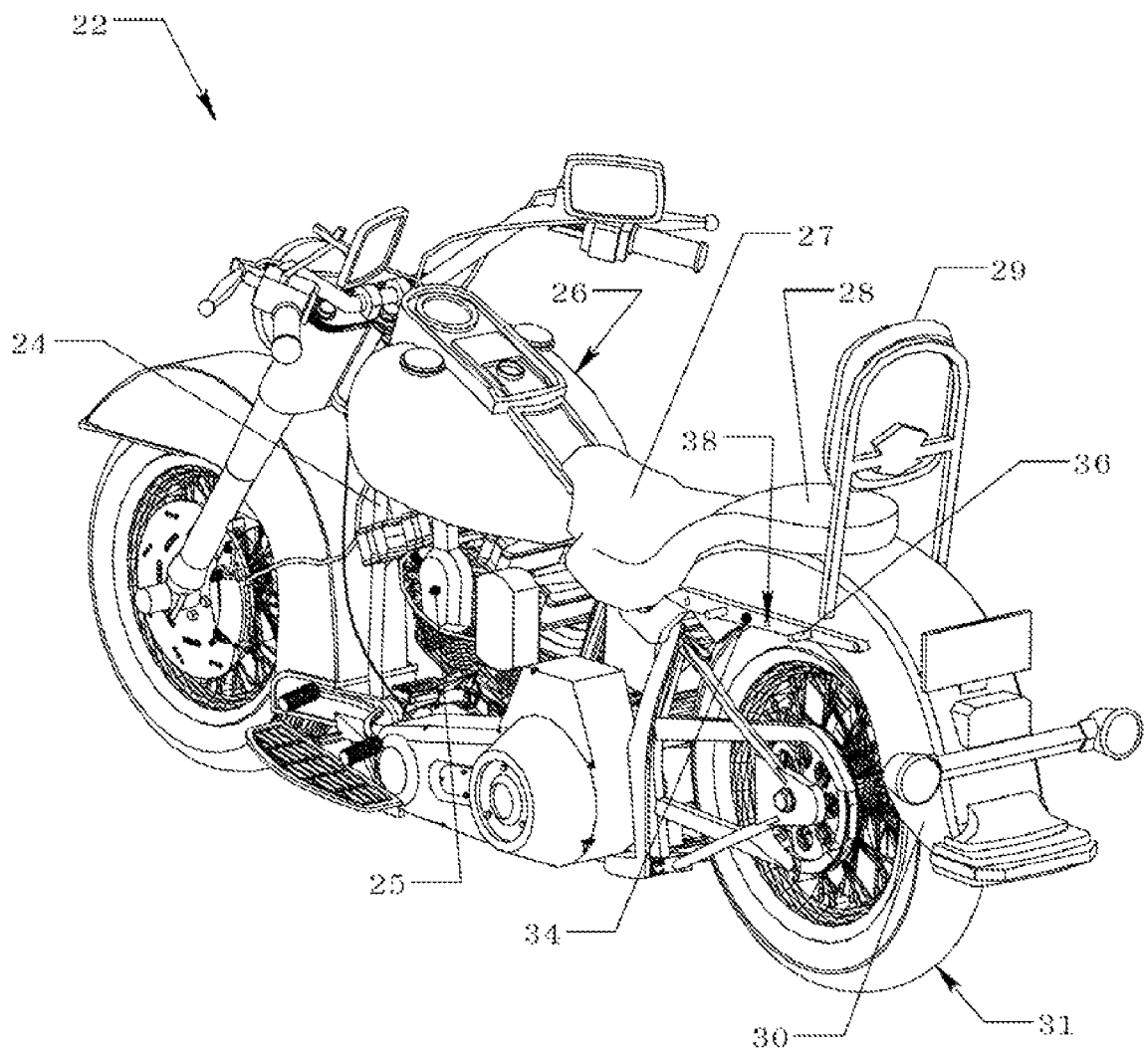
FIG. 1 is substantially a side perspective view of a motorcycle showing an attachment bracket.

Referring to FIG. 1, a conventional motorcycle is shown. Motorcycle 22 can include a frame 24 and an engine 25 mounted to the frame 24. A primary or main fuel tank 26 is also mounted to the frame 24. Main fuel tank 26 can hold a fuel such as gasoline and can supply engine 25 with fuel through a device such as a fuel injector or carburetor (not shown). In a typical motorcycle, the fuel is provided to the engine by gravity flow from the main fuel tank 26.

A driver's seat 27 is attached to frame 24 and allows a driver or operator to sit and operate the motorcycle. A passenger seat 28 and a backrest 29 are also attached to frame 24. A fender 30 covers back tire 31. The fender 30 and back tire 31 are attached to frame 24.

A pair of saddlebag brackets 34 can be attached to frame 24 on each side of passenger seat 28. A fastener 38 such as a screw or rivet can be used to attach brackets 34 to frame 24. Bracket 34 may have an attachment point 36. Attachment point 36 may be various devices such as a threaded stud or a stud with a cotter pin.

Figure 2:
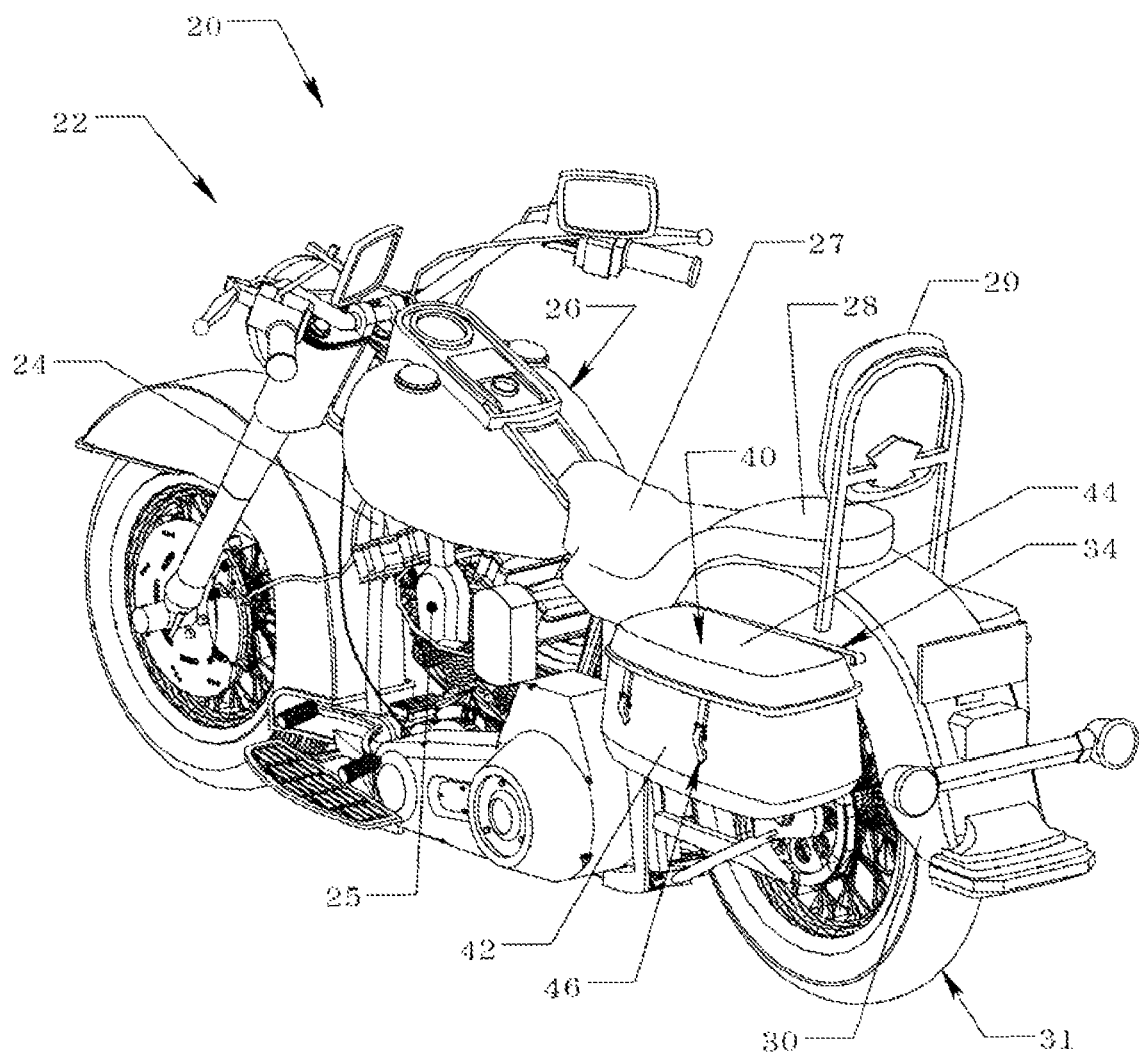
FIG. 2 is substantially a side perspective view of a motorcycle with a saddlebag.
Figure 3:
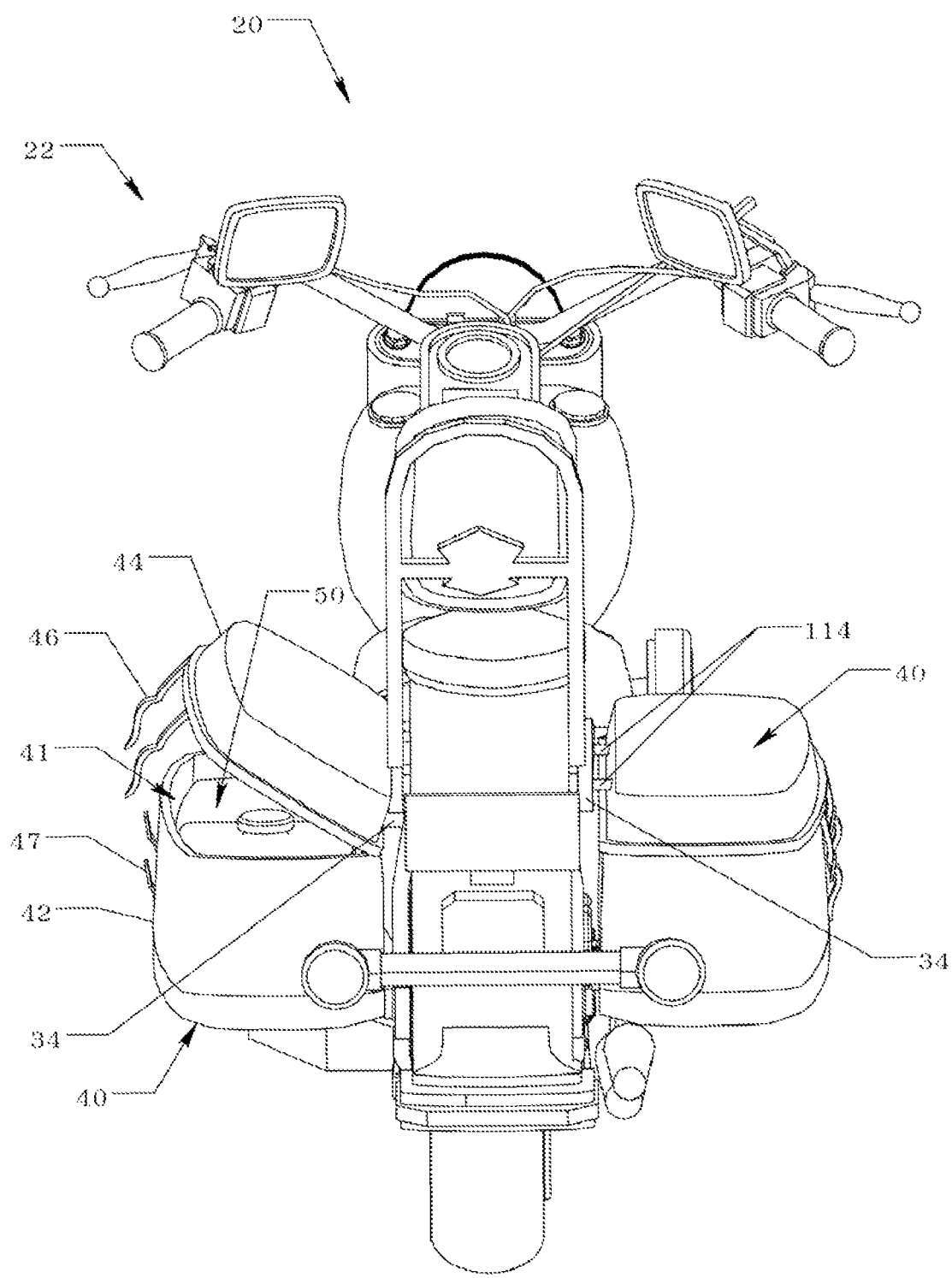
FIG. 3 is substantially a side perspective view of the motorcycle of FIG. 2 illustrating an auxiliary fuel tank mounted in a saddlebag.

Turning now to FIGS. 2 and 3, a motorcycle and auxiliary fuel tank assembly 20 is shown. A pair of saddlebags 40 can be mounted to saddlebag brackets 34. One of saddlebags 40 may be mounted to bracket 34 on each side of passenger seat 28. Saddlebags 40 can be made out of various materials such as leather or plastic. Saddlebags 40 allow for increased storage and the capacity to carry various items by the motorcycle such as luggage and goods.

Saddlebags 40 may have an interior cavity 41 that is formed by walls 42. A cover 44 may be attached to walls 42 in order to seal or close cavity 41. Straps 46 may be mounted to cover 44 and can be used with a buckle 47 mounted to one of walls 42 in order to retain cover 44 in a closed position. A fuel tank 50 may be mounted or contained by saddlebag 40 within cavity 41.

Fuel tank 50 may have a shape that substantially conforms to the contours of the saddlebag 40 or abuts the sides of the saddlebag. This prevents fuel tank 50 from shifting when the motorcycle is moving.

With reference now to FIGS. 4-8, details of fuel tank 50 are shown. A fuel tank 50 can include a container 49 that has outer walls 51. Container 49 can be formed from a wide variety of materials that are compatible with various fuels such as metals or plastics. Container 49 may be formed using a number of methods. For example, container 49 may be formed by rotationally molding plastic or by cutting (stamping) and welding metal. The size of container 49 may depend on the size or appearance of the saddlebag used on the motorcycle. In one embodiment, container 49 is capable of holding about five gallons of fuel.

Outer walls 51 can include a top side 52, raised portion 53, bottom side 54, front side 56, back side 58, left side 60, rounded right side 62 and flat right side 64. Outer walls 51 define a cavity or reservoir 68 inside container 49.

A flange 72 can be located in top side 52 and extend upwardly from top side 52. An opening or fill port 70 may be located in flange 72. Fill port 70 is in fluid communication with reservoir 68 and allows a user to fill reservoir 68 with fuel. A cover or cap 74 may be used to seal fill port 70. Cap 74 may have threads 75 that mate with threads (not shown) on the inside of fill port 70. Cap 74 may be screwed into fill port 70 in order to seal fuel within reservoir 68.

Fuel tank 50 may include several threaded studs 110 that extend from back side 58.

Container 49 can further include a finger channel 80 that is located in back side 58. A tube channel 82 may also be located in back side 58 and may connect with a finger channel 80. A transfer tube 98 may extend through tube channel 82 and finger channel 80.

A pump cavity 86 can extend into container 49 on bottom side 54 and back side 58. A filter cavity 84 can also extend into container 49 on bottom side 54 and back side 58. A drain port 90 may be located in filter cavity 84 along bottom side 54. Drain port 90 can allow fuel to be removed or transferred from reservoir 68.

A fuel pump 92 can be mounted in pump cavity 86 and attached to supports 87 by a bracket 93. Fuel pump 92 can be connected to a source of electrical energy such as a motorcycle battery (not shown) in order to power fuel pump 92. A hose 96 can have one end connected with drain port 90 and the other end connected to a fuel filter 94. Fuel filter 94 may be located in filter cavity 84. A hose 97 may be connected between fuel filter 94 and fuel pump 92. Hoses 96 and 97 allow for fuel filter 94 and fuel pump 92 to be in fluid communication with drain port 90.

Transfer tube 98 has ends 98A and 98B. End 98A is connected to fuel pump 92. End 98B may be connected to a quick disconnect coupling 99. Quick disconnect coupling 99 may be connected to several locations. Quick disconnect coupling 99 can be connected with main fuel tank 26 or may be connected with engine 25 or may be connected with a manifold 120.

Quick disconnect coupling 99 may be used to easily connect and disconnect transfer tube 98. This allows the auxiliary fuel tank 50 to be quickly and easily disconnected and removed from the motorcycle if desired. When auxiliary fuel tank 50 is located inside saddlebag 40, the transfer tube 98 may exit the saddlebag through the main opening of the bag or a small hole may be made in the saddlebag for transfer tube 98. Transfer tube 98 may be used to transfer fuel to another motorcycle. Transfer tube 98 may be connected to the other motorcycle via quick disconnect coupling 99 or it may be inserted into a fill port of the other motorcycle's main fuel tank.

A bracket 100 can have bars 102 that are arranged in a pattern to form bracket 100. Several holes 104 may be located in bars 102. A pair of openings 108 are formed by bars 102. Bracket 100 may be formed from a metal such as steel by a stamping process.

Bracket 100 can be attached to fuel tank 50 using studs 110. Studs 110 can pass through holes 104 and be retained to bracket 100 using a fastener 112 such as a nut. Fuel tank 50 and bracket 100 may be mounted in saddlebag cavity 41. Fuel tank 50 and bracket 100 are placed in cavity 41. Studs 114 (FIG. 3) can extend from bracket 34 through saddlebag 40 and through holes 104 of bracket 100. Fasteners 116 such as a nut can be used to retain bracket 100 to studs 114. In this manner, fuel tank 50 is securely attached to bracket 34 while being contained within saddlebag 40.

Figure 8:
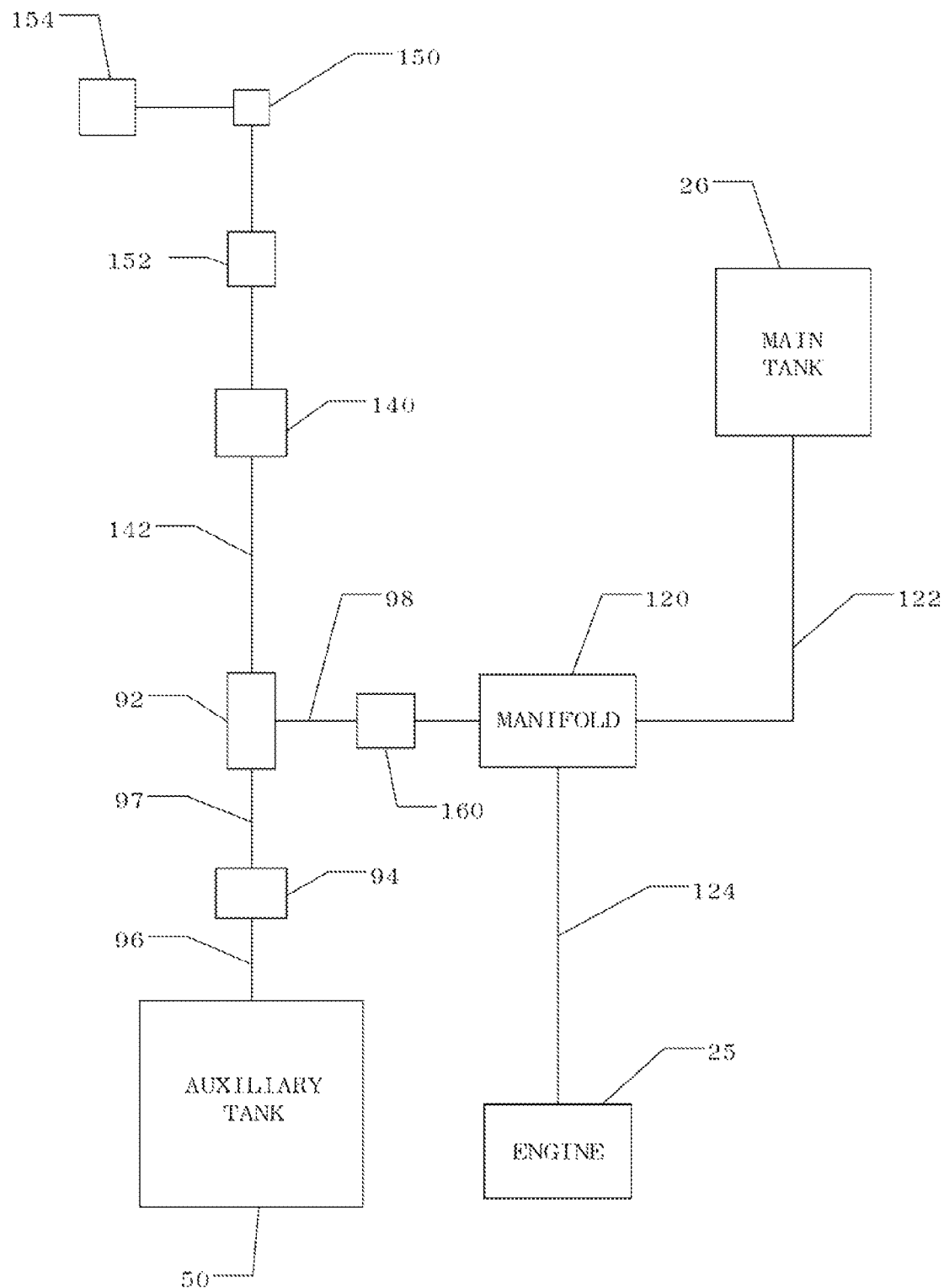
FIG. 8 is substantially a diagrammatic view of a fuel supply system for a motorcycle.

Turning now to FIG. 8, a diagrammatic view of a motorcycle fuel system is shown. A manifold 120 can be connected between engine 25 and main fuel tank 26. Manifold 120 may be in fluid communication with main fuel tank 26 through a fuel hose 122. Manifold 120 may be in fluid communication with engine 25 through a fuel hose 124. Manifold 120 may include several valves (not shown) that can either be manually switched or electrically switched in order to direct the flow of fuel between the engine and the fuel tanks.

Manifold 120 can further be in fluid communication with fuel pump 92 through transfer tube 98. Fuel pump 92 is in fluid communication with fuel filter 94 through hose 97 and in fluid communication with auxiliary fuel tank 50 through hose 96. Fuel pump 92 may be connected to a switch 140 through a wire 142. Switch 140 may have to be depressed and held in order to turn fuel pump 92 on, in order to transfer fuel from auxiliary fuel tank 50 to main fuel tank 26.

Switch 140 may be manually operated. In one embodiment, switch 140 is a dead man switch that must be continuously depressed to activate fuel pump 92. This prevents the motorcycle operator from forgetting that fuel pump 92 is on or accidentally activating the pump for a long period, thereby overfilling main fuel tank 26. Switch 140 may be placed near the driver's seat 27 of the motorcycle.

Fuel pump 92 can move fuel between fuel tanks 50 and 26. Fuel pump 92 may be connected to the electrical power system of the motorcycle. A dedicated circuit may be provided for fuel pump 92, including a circuit breaker 152 on the motorcycle's circuit breaker panel (not shown). Fuel pump 92 may be connected to an electrical circuit on the motorcycle. For example, fuel pump 92 may be connected to an engine on/of switch 150, which is on when a motorcycle is running. On/off switch 150 is connected to a power source 154 such as a motorcycle battery. Alternatively, fuel pump 92 may be manually operated.

In one embodiment, the fuel pump 92 is reversible so that fuel may be pumped from the main fuel tank 26 to the auxiliary fuel tank 50. In this embodiment, the user may fill the auxiliary fuel tank 50 by pumping fuel to the auxiliary fuel tank 50 from main fuel tank 26 rather than using the fill port 70. Alternatively, the auxiliary fuel tank 50 may be filled by allowing gravity to fill the tank through fill port 70. A one-way check valve 160 may also be mounted between auxiliary fuel tank 50 and main fuel tank 26, if it is desired for fuel only to flow from auxiliary fuel tank 50 to main fuel tank 26.

Alternative Embodiment

Figure 9:
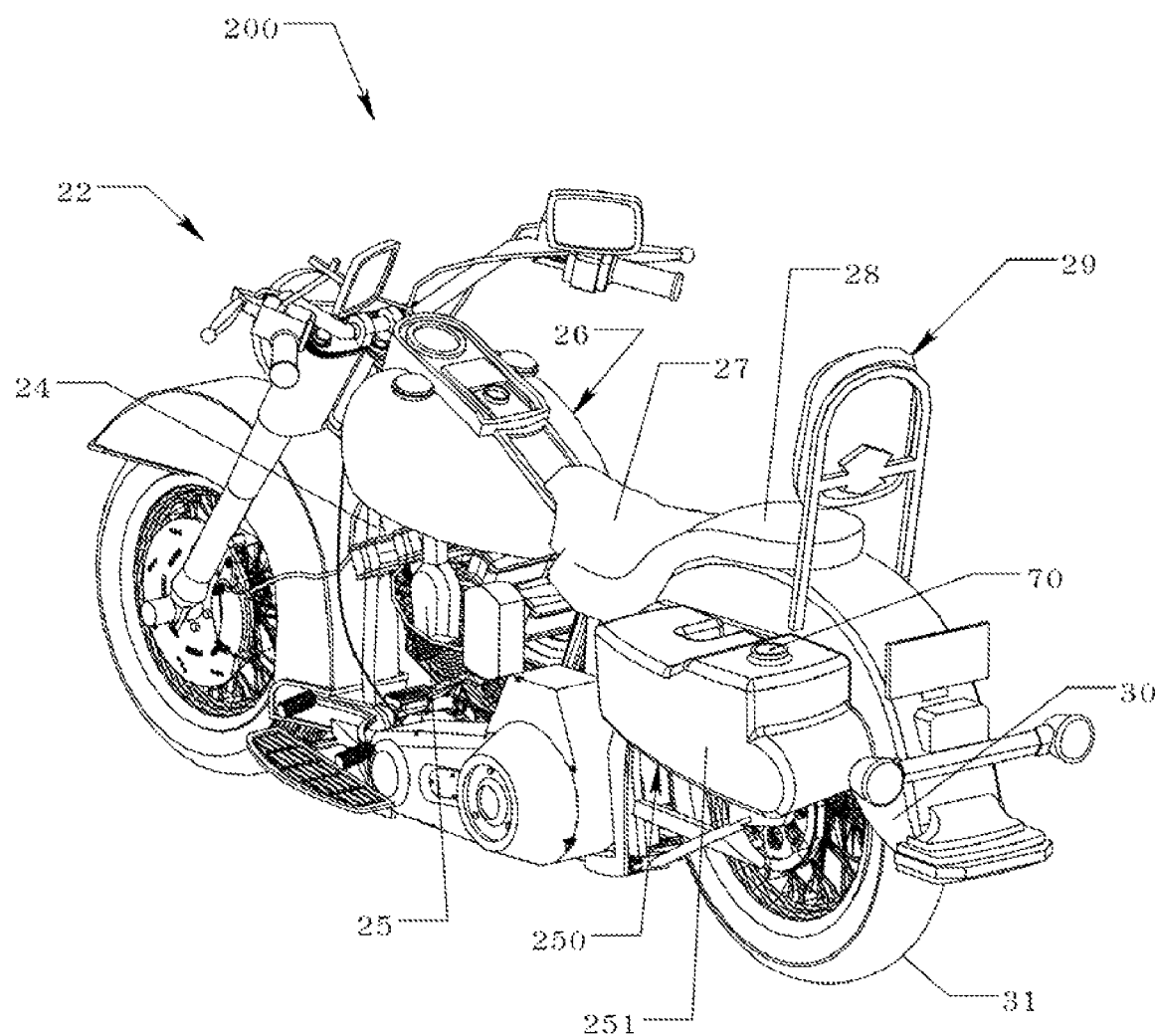
FIG. 9 is substantially a side perspective view of an alternative embodiment of a motorcycle with an auxiliary fuel tank of the present invention.
Figure 10:
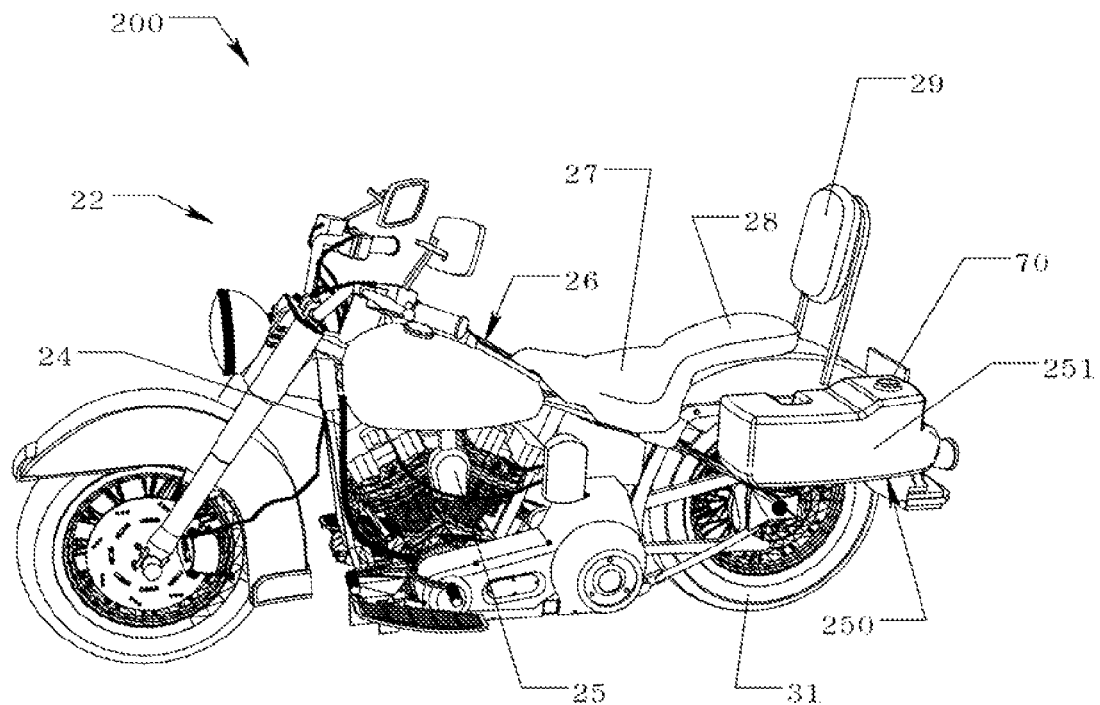
FIG. 10 is substantially another side perspective view of the motorcycle with an auxiliary fuel tank of FIG. 9.

Referring now to FIGS. 9 and 10, an alternative embodiment of a motorcycle with an auxiliary fuel tank 200 is shown. An auxiliary fuel tank 250 can be mounted to frame 24. Auxiliary fuel tank 250 is similar to auxiliary fuel tank 50 except that saddlebags 40 (FIGS. 2 and 3) are omitted and the outer surface of the auxiliary fuel tank is made to appear like a saddlebag. Fuel tank 250 may have a size and shape that is similar to a saddlebag.

A leather covering may be attached to the outer walls 251 of the fuel tank by an adhesive or attachment devices, such as screws, staples or rivets. If attachment devices are used, the walls of the tank may be thicker where the devices are applied to prevent the devices from puncturing the walls of the tank. Alternatively, fuel tank 250 may have an integrally formed surface that looks like leather and has the texture and color of leather.

Figure 4:
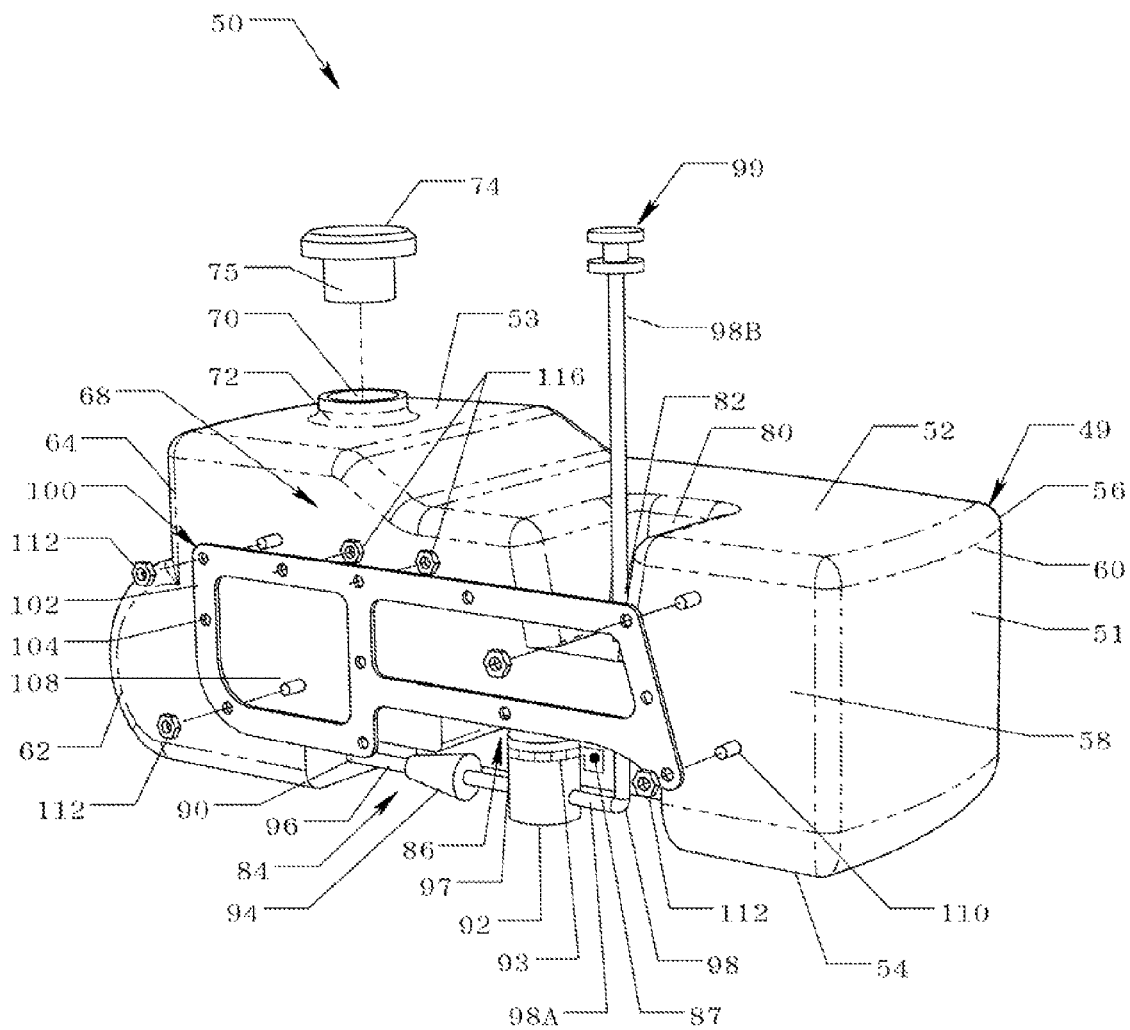
FIG. 4 is substantially a rear isometric view of a fuel tank of the present invention.
Figure 5:
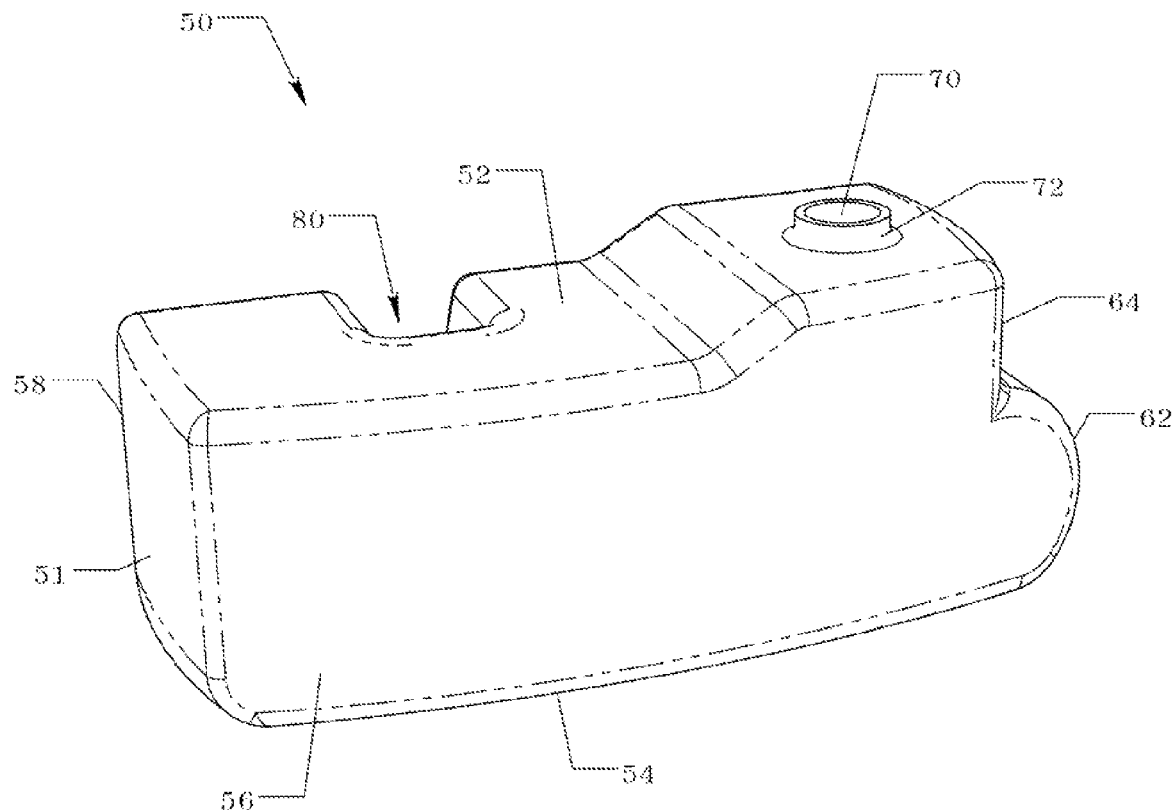
FIG. 5 is substantially a front isometric view of the fuel tank of FIG. 4.
Figure 6:
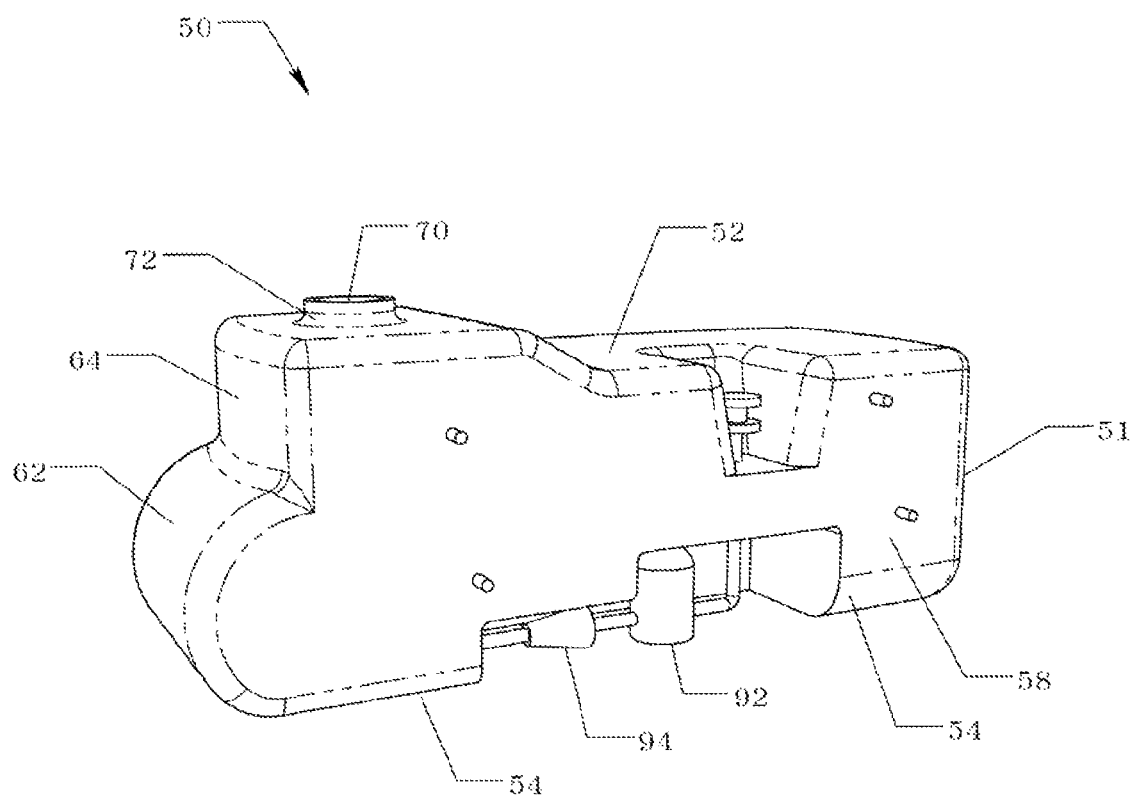
FIG. 6 is substantially a left side isometric view of the fuel tank of FIG. 4.
Figure 7:
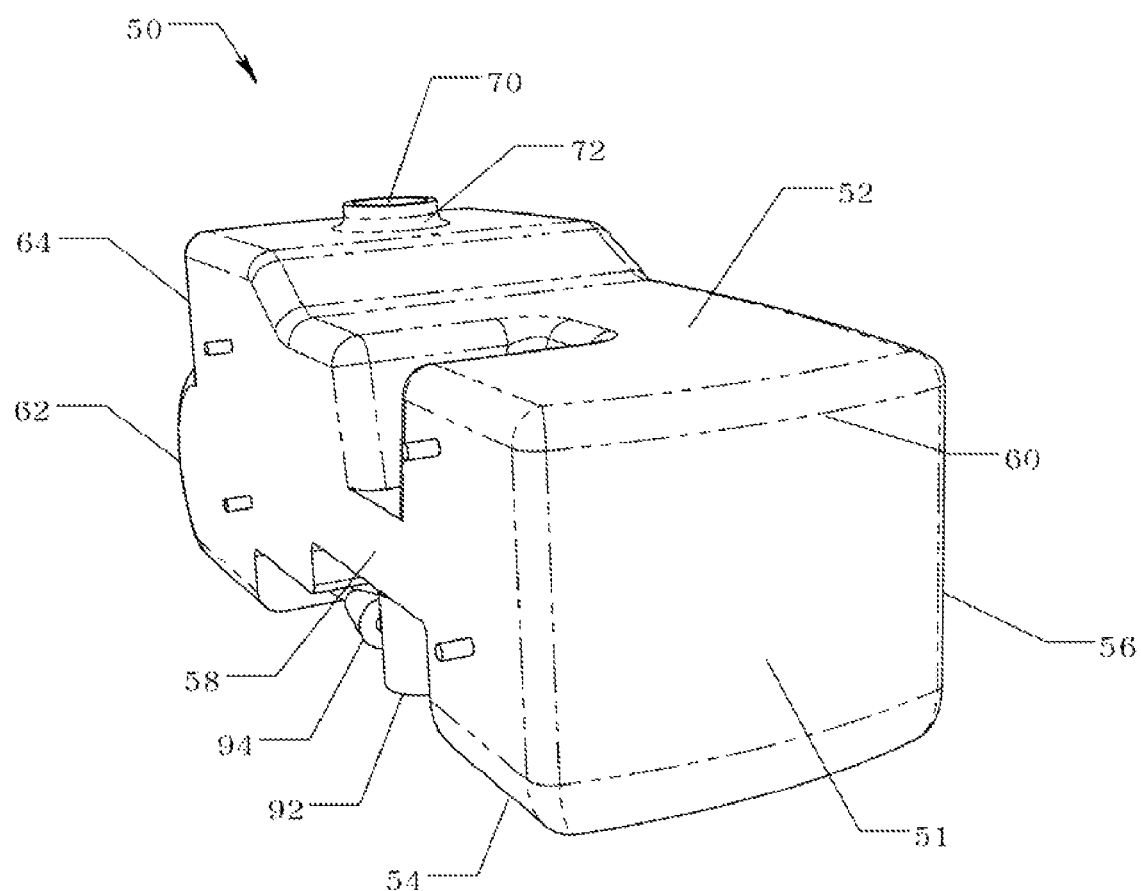
FIG. 7 is substantially a right side isometric view of the fuel tank of FIG. 4.

Auxiliary fuel tank 250 may be mounted to frame 24 using saddlebag bracket 34 (FIGS. 1 and 3). Saddlebag bracket 34 may be directly attached to auxiliary fuel tank 250 using studs 110 (FIG. 4). Motorcycles have specific mounting points for saddlebags and mounting bracket 34 may be configured to attach to those mounting points.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A fuel tank for a motorcycle comprising:
   (A) a container defining a reservoir for holding fuel, the container having an outer wall, the outer wall defining a cavity;
   (B) a mounting mechanism coupled with the container, the mounting mechanism being adapted to be connected with the motorcycle in order to support the container; and
   (C) a pump connected to the outer wall and located at least partially within the cavity.

2. The fuel tank of claim 1, wherein the container has a fill port.

3. The fuel tank of claim 1, wherein the container has a lid.

4. The fuel tank of claim 1, wherein the container has a drain port.

5. The fuel tank of claim 1, wherein a transfer tube is in fluid communication between the container and a main fuel tank.

6. The fuel tank of claim 5, wherein the pump is connected between the transfer tube and the container.

7. The fuel tank of claim 1, wherein a fuel filter is coupled with the pump.

8. The fuel tank of claim 5, wherein the container has a channel, the transfer tube extending through the channel.

9. A fuel tank for a motorcycle comprising:
   (A) a container defining a substantially enclosed reservoir for storing fuel, the container having an outer wall defined by a plurality of side surfaces, the container positioned within a saddlebag;
   (B) a fill port located in the outer wall;
   (C) a drain port located in the outer wall; and
   (D) a bracket coupled with the container, the bracket configured to attach the container to the motorcycle.

10. The fuel tank of claim 9, wherein a transfer tube is in fluid communication between the container and a main fuel tank.

11. The fuel tank of claim 10, wherein a fuel pump is connected between the transfer tube and the container.

12. The fuel tank of claim 9, wherein the container has a cavity for holding a fuel pump.

13. The fuel tank of claim 11, wherein a fuel filter is coupled with the fuel pump.

14. The fuel tank of claim 10, wherein the container has a channel, the transfer tube extending through the channel.

15. A fuel tank for a motorcycle comprising:
   (A) container means for holding fuel, the container means having an outer wall defining a cavity;
   (B) mounting means coupled to the container means for retaining the container means to the motorcycle, the mounting means being adapted to support the container means; and
   (C) pump means coupled to the outer wall and mounted in the cavity for transferring fuel from the container means.

16. The fuel tank of claim 15, wherein the container means is mounted within a saddlebag.

17. The fuel tank of claim 15, wherein a fuel filter is coupled to the pump means and mounted in the cavity.

18. The fuel tank of claim 15, wherein a transfer tube is in fluid communication with the pump means.

19. The fuel tank of claim 18, wherein the container means has a channel, the transfer tube extending through the channel.

20. The fuel tank of claim 15, wherein a fill port and a drain port are located in the outer wall.

* * * * *